Nov. 28, 1961

A. M. ANGEL ET AL 3,011,165

CODE CONVERSION SYSTEM

Filed Nov. 1, 1957

6 Sheets-Sheet 1

INVENTORS:
Arthur M. Angel
Robert Frohman

Louis A. Kline

By John T. Matlago
Attorneys.

Nov. 28, 1961 A. M. ANGEL ET AL 3,011,165

CODE CONVERSION SYSTEM

Filed Nov. 1, 1957 6 Sheets-Sheet 2

INVENTORS:
Arthur M. Angel
Robert Frohman

By Louis A. Kline
John J. Matlago
Attorneys,

Fig. 3

| Character | Coded Input Signals — Switches $S_2, S_4, S_{11}$ Closed, Code F | | | | | | | | Switches $S_2, S_3, S_{13}$ Closed, Code D | | | | | | | | Switches $S_1, S_4, S_{15}$ Closed, Code T | | | | | | | Coded Output Signals — Processor Code | | | | | | | |
|---|---|---|---|---|---|---|---|---|---|---|---|---|---|---|---|---|---|---|---|---|---|---|---|---|---|---|---|---|---|---|---|
| | $I_6$ | $I_5$ | $I_4$ | $I_3$ | $I_2$ | $I_1$ | F.F. A1 | Core Selected | $I_7$ | $I_6$ | $I_5$ | $I_4$ | $I_3$ | $I_2$ | $I_1$ | Core Selected | $I_5$ | $I_4$ | $I_3$ | $I_2$ | $I_1$ | F.F. A1 | Core Selected | $I_{P8}$ | $I_{P7}$ | $I_{P6}$ | $I_{P5}$ | $I_{P4}$ | $I_{P3}$ | $I_{P2}$ | $I_{P1}$ |
| 0 | 0 | 0 | 1 | 0 | 1 | 0 | 0 | 04-10 | 1 | 1 | 0 | 0 | 0 | 0 | 0 | 01-02 | 0 | 1 | 1 | 0 | 1 | 1 | 13-04 | 0 | 0 | 0 | 0 | 0 | 0 | 0 | 0 |
| 1 | 0 | 0 | 0 | 0 | 0 | 1 | 0<br>1 | 00-04<br>01-04 | 0 | 0 | 0 | 1 | 1 | 0 | 0 | 12-00 | 1 | 1 | 1 | 0 | 1 | 1 | 13-05 | 0 | 0 | 0 | 0 | 0 | 0 | 0 | 1 |
| 2 | 0 | 0 | 0 | 0 | 1 | 0 | 0 | 00-08 | 0 | 0 | 1 | 0 | 1 | 0 | 0 | 04-01 | 1 | 1 | 0 | 0 | 1 | 1 | 09-05 | 0 | 0 | 0 | 0 | 0 | 0 | 1 | 0 |
| 3 | 0 | 0 | 0 | 0 | 1 | 1 | 0 | 00-12 | 0 | 0 | 1 | 1 | 0 | 0 | 0 | 08-01 | 1 | 0 | 0 | 0 | 0 | 1 | 01-01 | 0 | 1 | 0 | 0 | 0 | 0 | 1 | 1 |
| 4 | 0 | 0 | 0 | 1 | 0 | 0 | 0 | 04-00 | 0 | 1 | 0 | 0 | 1 | 0 | 0 | 04-02 | 0 | 1 | 0 | 1 | 0 | 1 | 09-08 | 0 | 0 | 0 | 0 | 0 | 1 | 0 | 0 |
| 5 | 0 | 0 | 0 | 1 | 0 | 1 | 0 | 04-04 | 0 | 1 | 0 | 1 | 0 | 0 | 0 | 08-02 | 0 | 0 | 0 | 0 | 1 | 1 | 01-04 | 0 | 1 | 0 | 0 | 0 | 1 | 0 | 1 |
| 6 | 0 | 0 | 0 | 1 | 1 | 0 | 0 | 04-08 | 0 | 1 | 1 | 0 | 0 | 0 | 0 | 00-03 | 1 | 0 | 1 | 0 | 1 | 1 | 05-05 | 0 | 1 | 0 | 0 | 0 | 1 | 1 | 0 |
| 7 | 0 | 0 | 0 | 1 | 1 | 1 | 0 | 04-12 | 1 | 0 | 0 | 0 | 1 | 0 | 0 | 05-00 | 1 | 1 | 1 | 0 | 0 | 1 | 13-01 | 0 | 0 | 0 | 0 | 0 | 1 | 1 | 1 |
| 8 | 0 | 0 | 1 | 0 | 0 | 0 | 0 | 08-00 | 1 | 0 | 0 | 1 | 0 | 0 | 0 | 09-00 | 0 | 1 | 1 | 0 | 0 | 1 | 13-00 | 0 | 0 | 0 | 0 | 1 | 0 | 0 | 0 |
| 9 | 0 | 0 | 1 | 0 | 0 | 1 | 0 | 08-04 | 1 | 0 | 1 | 0 | 0 | 0 | 0 | 01-01 | 0 | 0 | 0 | 1 | 1 | 1 | 01-12 | 0 | 1 | 0 | 0 | 1 | 0 | 0 | 1 |
| A | 0 | 1 | 0 | 0 | 0 | 1 | 0 | 00-05 | 0 | 0 | 1 | 0 | 0 | 1 | 0 | 04-08 | 0 | 1 | 1 | 1 | 0 | 0 | 08-01 | 0 | 1 | 0 | 1 | 0 | 0 | 0 | 1 |
| a | 0 | 1 | 0 | 0 | 0 | 1 | 1 | 01-05 | | | | | | | | | | | | | | | | 1 | 1 | 0 | 1 | 0 | 0 | 0 | 1 |
| G | 0 | 1 | 0 | 1 | 1 | 1 | 0<br>1 | 04-13<br>05-13 | 0 | 0 | 0 | 0 | 1 | 0 | 1 | 04-04 | 0 | 1 | 0 | 1 | 1 | | 08-12 | 0 | 0 | 0 | 1 | 0 | 1 | 1 | 1 |
| H | 0 | 1 | 1 | 0 | 0 | 0 | 0<br>1 | 08-01<br>09-01 | 1 | 1 | 1 | 1 | 0 | 0 | 1 | 08-04 | 0 | 0 | 1 | 0 | 1 | | 04-04 | 0 | 0 | 0 | 1 | 1 | 0 | 0 | 0 |
| I | 0 | 1 | 1 | 0 | 0 | 1 | 0<br>1 | 08-05<br>09-05 | 0 | 0 | 1 | 0 | 0 | 0 | 1 | 00-05 | 0 | 1 | 1 | 0 | 0 | 0 | 12-00 | 0 | 0 | 0 | 1 | 1 | 0 | 0 | 1 |
| Code Delete | 1 | 1 | 1 | 1 | 1 | 1 | 0<br>1 | 12-15<br>13-15 | | | | | | | | | | | | | | | | $I_{C9}=1$ | | | | Control Signals | | | |
| Upper Shift | 0 | 1 | 1 | 0 | 1 | 1 | 0<br>1 | 08-13<br>09-13 | | | | | | | | | 1 | 1 | 0 | 1 | 1 | 0<br>1 | 08-13<br>09-13 | $I_{C9}=1$ $I_{C10}=1$ | | | | | | | |
| Lower Shift | 0 | 1 | 1 | 0 | 1 | 0 | 0<br>1 | 08-09<br>09-09 | | | | | | | | | 1 | 1 | 1 | 1 | 1 | 0<br>1 | 12-13<br>13-13 | $I_{C9}=1$ $I_{C11}=1$ | | | | | | | |

INVENTORS:
Arthur M. Angel
Robert Frohman
By Louis A. Kline
John J. Matlago
Attorneys.

Nov. 28, 1961

A. M. ANGEL ET AL

CODE CONVERSION SYSTEM 3,011,165

Filed Nov. 1, 1957

6 Sheets-Sheet 4

INVENTORS:
Arthur M. Angel
Robert Frohman
By Louis A. Kline
John T. Matlago
Attorneys.

INVENTORS:
Arthur M. Angel
Robert Frohman
By Louis A Kline
John J. Matlago
Attorneys Nov. 28, 1961 A. M. ANGEL ET AL 3,011,165

CODE CONVERSION SYSTEM

Filed Nov. 1, 1957 6 Sheets-Sheet 6

INVENTORS:
Arthur M. Angel
Robert Frohman

By Louis A. Kline
John T. Matlago
Attorneys

1

2

3,011,165
CODE CONVERSION SYSTEM

Arthur M. Angel, Rolling Hills, and Robert Frohman, Gardena, Calif., assignors to The National Cash Register Company, Dayton, Ohio, a corporation of Maryland Filed Nov. 1, 1957, Ser. No. 693,871
8 Claims. (Cl. 340—347)

This invention relates to code conversion apparatus and more particularly to an improved conversion matrix utilizing magnetic cores for converting information encoded in any one of a plurality of input codes to a desired output code.

In the computer art, characters represented in various binary codes, as stored on punched tape, for example, may be required to be read and converted into a common code to be operated upon in a central data processor. One of the problems in conversion of characters from one code to another is that various storage codes, as read from the tape, may vary greatly from each other as, for example, by having different numbers of binary bits in different codes to represent characters or by having some codes utilizing a separate character to determine whether subsequent stored characters are upper case or lower case in form.

In the prior art, diode matrices have been employed for converting characters represented in an input code into an output code to be used, for example, in a central data processor. In one arrangement, the binary signals representing characters of an input code are passed into a diode matrix which decodes the binary signals to thereby select a certain line, for each input character, on which to pass a signal. After this selection, the signal passes on this selected line to an encoding matrix comprising diodes arranged so the signal causes binary output signals to be formed on output lines, which output signals represent the desired characters in the output code. One disadvantage of this arrangement is that a large number of diodes are required, and also that a large amount of current is required by these diodes. Also when a plurality of input codes are to be converted to an output code, gating arrangements which result in an increased number of components are required.

An object of this invention is to provide a code conversion system for converting information represented in one of a plurality of input codes to information represented in a common output code, in an improved and simplified manner, by the utilization of magnetic cores.

Another object of this invention is to provide a code conversion system which is economical in the employ of diode components and overall component requirements, and from the viewpoint of power dissipation requirements.

Another object of this invention is to provide a code conversion system which forms a parity check bit in a simplified manner with a minimum of additional components.

Another object of this invention is to provide a code conversion system which decodes a character represented in an input code as a result of selection of a magnetic core to be driven to its opposite magnetic state, and encodes the character into an output code as a result of the presence or absence of sense lines wound through the selected core.

A further object of this invention is to provide an improved arrangement for obtaining output pulses in response to signals provided by cores changing state.

Briefly, the code conversion system of this invention comprises a matrix of magnetic cores, individual cores of which are selected by decoding networks responding to combinations of binary signals representing input characters in various input codes. For each core corresponding to an input code, a unique set of sense lines is provided, with one sense line connected to each sense amplifier of a unique set of sense amplifiers for that code. The outputs of corresponding sense amplifiers of all sets are connected in common to corresponding lines of a set of output lines. Thus desired combinations of the presence or absence of the sense lines for each input code are wound through each core representing characters in that code, so that selection of each core causes signals to be formed on certain sense lines. These signals activate desired combinations of the sense amplifiers to form true output signals on desired output lines, thus forming coded output signals. Therefore, decoding of the input characters is carried out by selecting cores, and encoding to form the output character is carried out by activating desired combinations of sense amplifiers as a result of the combinations of the presence or absence of sense lines wound through the selected cores. Switches are provided with certain ones being closed in order to change the decoding networks for the different input codes, i.e., 5, 6, 7, or 8 bit codes, and to select the different sets of sense amplifiers to be used for the different input codes. Although in each input code a unique core is selected for each input character by the decoding networks, where similar binary combinations of signals are utilized to represent characters in more than one of the input codes, the same core is selected for decoding the characters in each of these input codes. A core selected by more than one of the input codes is wound with a desired combination of the presence and the absence of sense lines required for each input code. Thus the binary output signals representing the output characters are formed for each input code, as selected by the previously mentioned switches. Also, binary output signals representing parity check bits are formed along with the signals representing the output characters. A novel circuit arrangement is utilized to form the binary output signals by delaying at the sense amplifier, the signal sensed as the result of the magnetic core changing state.

Further objects and advantages of the invention will be apparent to those skilled in the art from the following drawings and descriptions in which:

FIG. 3 is a table showing the binary states of the input codes, the cores selected for decoding these input codes and the binary states of the output code.

Figure 1:
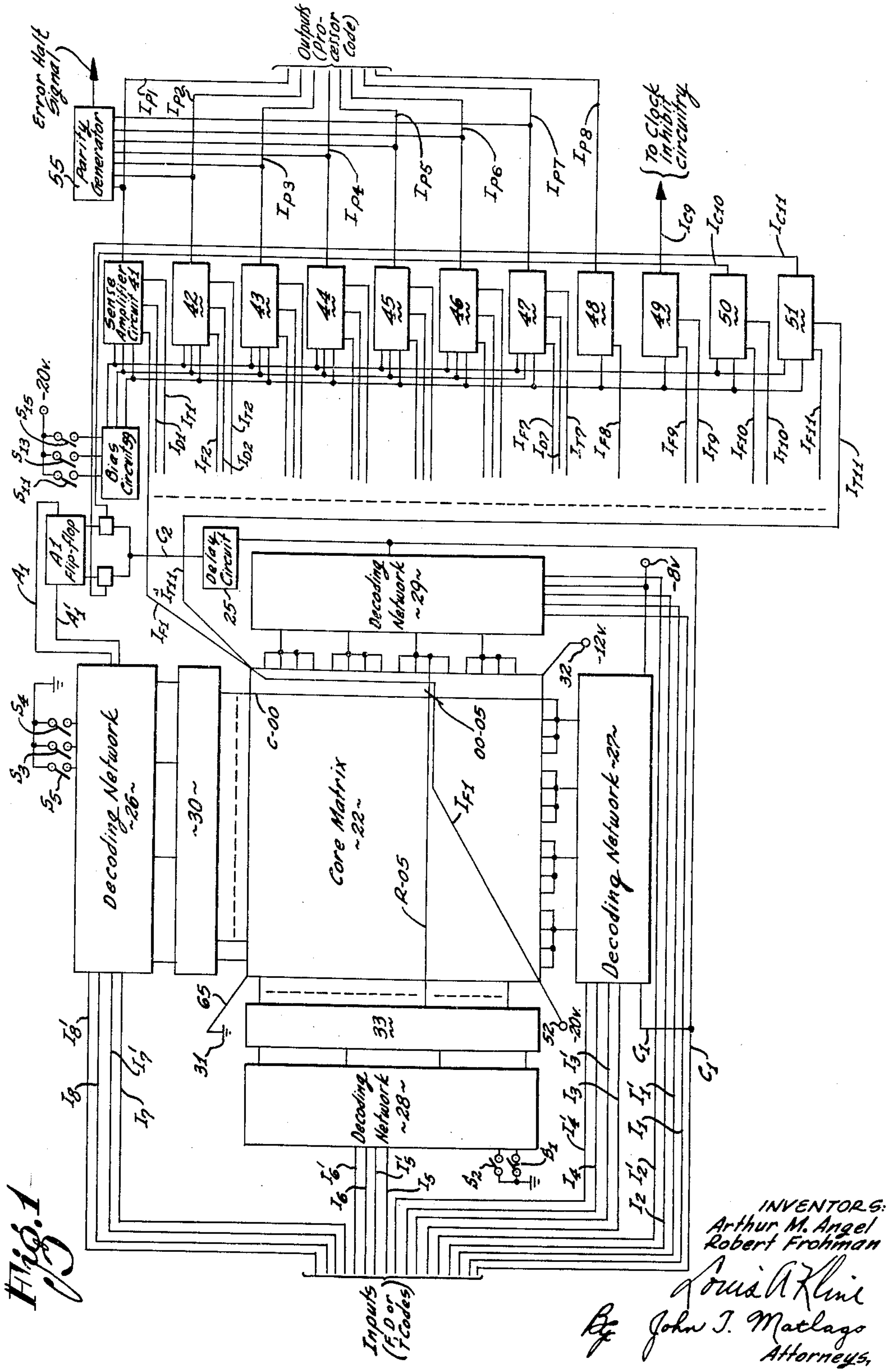
FIG. 1 is a block diagram of the code conversion system of this invention.

Referring first to FIG. 1, a block diagram is shown of the code conversion system of this invention showing the input lines which carry coded input signals received from tape reading circuitry, for example, and the output lines which carry coded output signals to the central data processor. Core matrix 22 comprises cores as 00–05 arranged so as to be wound with column drive lines as C–00 and row drive lines as R–05. Decoding of an input character represented by coded input signals in codes F, D, or T is carried out by selection of a column and a row drive line, as C–00 and R–05, respectively, to select and drive a core, as will be explained subsequently. The coded input signals, as $I_1$, $I_2$, $I_3$, etc., and clock signal $C_1$ are signals received from reading heads for punched tape comprising photodiodes, and passed through pulse forming and amplifying circuitry (not shown). The primes of the input signals, as $I_1'$, $I_2'$, $I_3'$, etc., which are required in order to decode the binary combinations, are signals received from the reading head for punched tape and inverted in the pulse forming and amplifying circuitry. Column drive lines as C–00 are selected by decoding network 26 acting through diode connections 30 to select a plurality of lines, one line as C–00 in each of four groups of lines, which groups are selected by decoding network 27. Row drive lines as R–05 are selected by decoding network 28 acting through diode connections 33 to select a plurality of lines, one line as R–05 in each of four groups of lines, which groups are selected by decoding network 29. The inputs to decoding networks 26 through 29 are the coded signals on lines $I_1$, $I_1'$, $I_2$, etc., as received from tape reading circuitry, representing the coded input characters, and the clock signal on line $C_1$. For converting the different input codes, switches $S_1$ and $S_2$ which control decoding network 28 and switches $S_3$, $S_4$, and $S_5$ which control decoding network 26 are set at desired configurations of being opened and closed for each input code F, D, and T, as will be explained subsequently. After a core is slected, i.e., the coded input signals as $I_1$, $I_1'$, $I_2$, etc., representing an input character are decoded, current pulses in response to clock signal $C_1$ are passed in coincidence through the selected column drive line and row drive line wound through the selected core to overcome a bias current passed through the cores. Thus the selected core is driven to its opposite state of magnetic flux. The bias current is supplied by a core biasing arrangement which passes current from ground 31 through line 65, through each of the cores of the matrix and thence to −12 volt terminal 32, as will also be explained subsequently.

For encoding the input character as determined by the core selected in each input code, desired sense lines as $I_{F1}$ of the set of sense lines $I_{F1}$ through $I_{T11}$ are wound through each core as 00–05, the presence of each sense line in a selected core resulting in a true signal on the sense line when the core is driven to its opposite magnetic state. All sense lines as $I_{F1}$, $I_{D1}$, $I_{T1}$, for encoding input codes F, D, and T, respectively, connect from −20 volt terminal 52 through the cores, as 00–05, to sense amplifier circuits, as 41, to form output signals on output lines as $I_{P1}$ in response to signals on the sense lines. The signals on output lines $I_{P1}$ through $I_{P6}$ represent the output character in the processor code and the signal on output line $I_{P7}$ represents the parity check bit accompanying the output character, as will be explained subsequently. The signal on output line $I_{P8}$ controlled by sense line $I_{F8}$ connected to sense amplifier circuit 43 is used to distinguish characters represented by the same binary combinations in the processor code as will also be explained subsequently. A parity generator 55 forms an error halt signal in response to an error as determined by the signals on output lines $I_{P1}$ through $I_{P7}$, as well known in the art. Other sense lines as $I_{F9}$ connect to sense amplifier circuits 49 to form control signal $I_{C9}$ which passes to clock inhibit circuitry (not shown) to control receiving of characters by the central processor. Also, other sense lines as $I_{F10}$ and $I_{F11}$ connect to sense amplifier circuits 50 and 51 to form control signals on lines $I_{C10}$ and $I_{C11}$, respectively. Flip-flop A1 which is triggered by clock signal $C_2$, which signal is clock signal $C_1$ delayed in delay circuit 25 as will be explained subsequently, has its outputs $A_1$ and $A_1'$ connected to decoding network 26 to control selection of cores for encoding upper or lower case output characters for certain input codes. A bias circuit 59 for the sense amplifiers is controlled by switches $S_{11}$, $S_{13}$, and $S_{15}$, one of which is selected and closed for each of the input codes to be converted to the output code in order to select a sense amplifier of each sense amplifier circuit, as 41.

Figure 2:
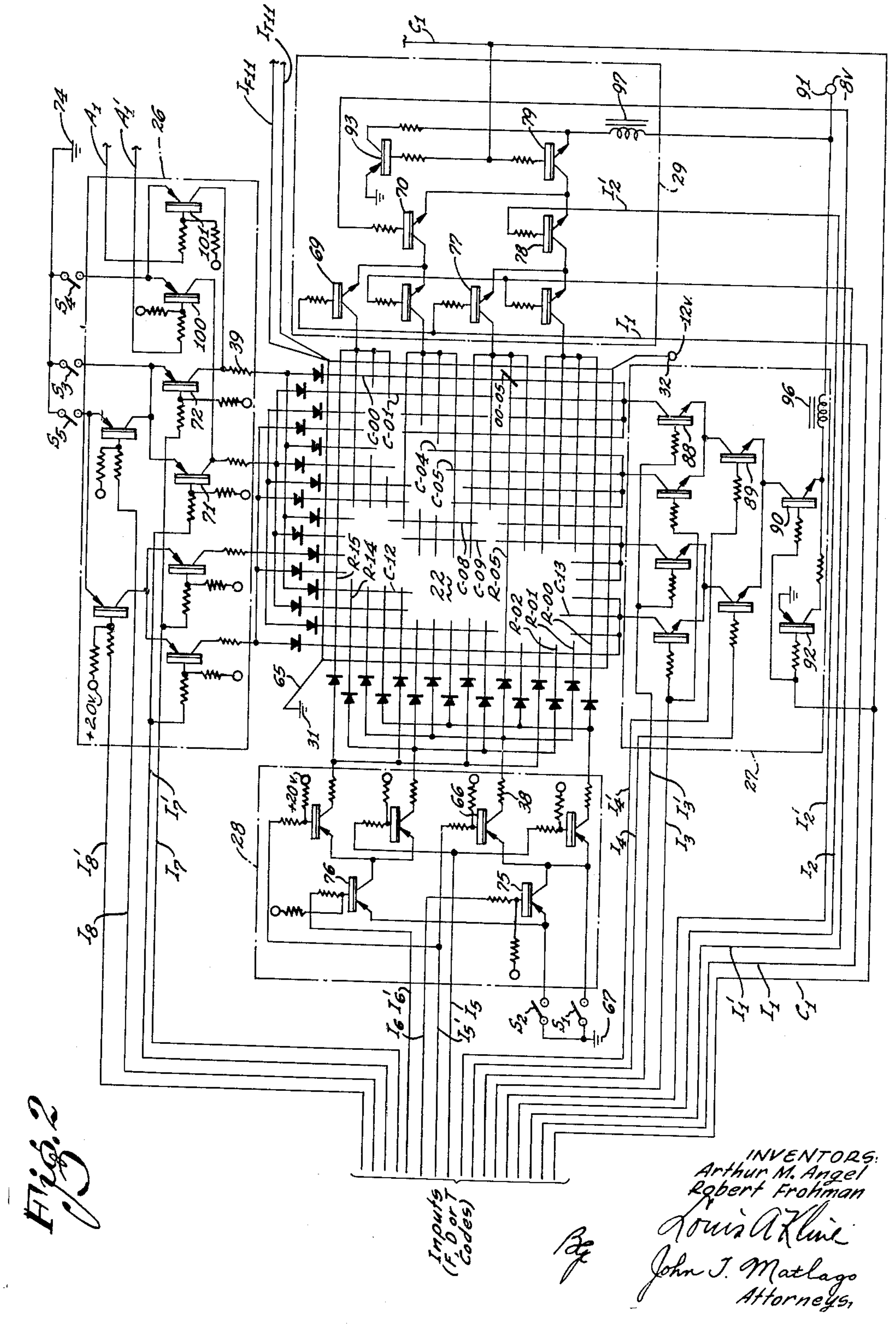
FIG. 2 is a schematic diagram of the core matrix and of the decoding networks for selecting the column and row drive lines.

Referring now to FIG. 2, a detailed schematic diagram is shown of a portion of the code conversion system of FIG. 1 showing the column and row drive lines of the core matrix and the decoding networks for selecting the column and row drive lines. As discussed, column drive lines as C–00 are selected by decoding networks 26 and 27 and row drive lines as R–05 are selected by decoding networks 28 and 29. To explain the decoding networks, refer also to FIG. 3 which is a table showing the binary states of characters represented in the input codes and the output code. The three input codes for this embodiment, codes F, D, and T, are comprised of six, seven, and five binary bits per character respectively. These codes are typical codes which may be used in storing characters on punched tape, for example. It is to be understood that the characters shown are to illustrate the features of this invention and additional characters may be utilized in a similar manner in each code. To select a core as 00–05, for example, which is selected to be driven to its opposite magnetic state for decoding the character I in code D, switches $S_2$ and $S_3$ are first closed by relays (not shown). It is to be noted that cores are designated by columns and rows as core 00–05 located in column C–00 and row R–05. Closing switch $S_2$ connects the emitters of transistors 75 and 76, which are of the p-n-p type, to ground 67, which transistors are controlled by input signals $I_6$ and $I_6'$, respectively, connected to their bases. Closing switch $S_3$ connects the emitters of transistors 71 and 72, which are of the p-n-p type, to ground 74, which transistors are controlled by input signals $I_7'$ and $I_7$, respectively, connected to their bases. Thus, as will be explained, the seven binary input signals representing the character I in code D can be decoded to select column and row drive lines as C–00 and R–05, respectively. It is to be noted that the logical voltage levels for this embodiment are ground and −8 volts for true and false signals, respectively, with a true signal representing a binary one and a false signal representing a binary zero. As seen in FIG. 3 for the character I in code D, input signals $I_3$ and $I_4$ are false. Therefore, transistors 88 and 89, which are of the n-p-n type, are biased into a conductive state by the signals on lines $I_3'$ and $I_4'$ which are connected to the base of transistors 88 and 89, respectively. Since signals $I_3'$ and $I_4'$ are at a high potential, the group of column drive lines comprising drive line C–00 is selected. Also since signal $I_7$ is false, transistor 72, which is of the p-n-p type, is biased into a conductive state as a result of the low potential of signal $I_7$ applied to its base to select line C–00 of the group selected by decoding network 27. Thus, when transistor 90, which is of the n-p-n type, is biased into conduction by a positive clock signal $C_1$ applied to its base, a current pulse passes from ground 74 through transistor 72, through current limiting resistor 39, through drive line C–00, through transistors 88, 89, and 90 and through inductor 96 to −8 volt terminal 91. Also, for the character I in code D, input signal $I_1$ is true and $I_2$ is false. Therefore, transistors 77 and 78, which are of the n-p-n type, are biased into a conductive state by signals $I_1$ and $I_2'$, respectively, applied to their bases at a high potential, to select the group of row drive lines comprising line R–05. Since input signal $I_5$ is true and $I_6$ is false, transistor 66, which is of the p-n-p type, is biased into a conductive state by signal $I_5'$ applied to its base at a low potential; and transistor 75, which is of the p-n-p type, is biased into a conductive state by signal $I_6$ applied to its base at a low potential. Thus drive line R–05 is selected in the group selected by decoding network 29. Therefore, when transistor 79, which is of the n-p-n type, is biased into conduction by a positive clock signal $C_1$, a current pulse is passed from ground 67 through transistors 75 and 66 through current limiting resistor 38, through drive line R–05, through transistors 77, 78, and 79 and through inductor 97 to −8 volt terminal 91 in coincidence with the current pulse passed through drive line C–00. Transistors 92 and 93 which are of the p-n-p type, are biased into conduction when clock signal $C_1$ is at a low potential to maintain a current from ground potential through inductors 96 and 97 at all times when transistors 90 and 79, respectively, are biased out of conduction. Thus, when transistors 90 and 79 are biased into conduction by clock signal $C_1$, inductors 96 and 97 act to resist changes of current through the drive lines caused by the back electromotive force induced by cores changing state, to maintain a driving current pulse of constant amplitude through the cores. The current driving pulses 57 and 58 (FIG. 8) of constant amplitude causes the signals on sense lines resulting from a core changing state to have a large amplitude and thus to give more reliable signals out of the sense amplifiers, as will be explained subsequently.

For selection of cores in code F, switches $S_2$ and $S_4$ are closed for conversion of this input code comprising six bits per character. Closing switch $S_2$ connects the emitters of transistors 75 and 76 to ground 67, which transistors are controlled by signals $I_6$ and $I_6'$, respectively, connected to their bases so as to include input signals $I_6$ and $I_6'$ in the decoding. Closing switch $S_4$ connects the emitter of transistors 100 and 101 to ground 74 so that when either output signal $A_1'$ or $A_1$, respectively, of flip-flop A1 is at a low potential, one transistor or the other will conduct. Core 00–05 which represents the character A in code F is selected in a similar manner in code F as explained for the selection of the same core 00–05 in code D, which core 00–05 represents the character I in code D. A feature of code F is that it has an upper and a lower shift input character that is decoded by selecting cores which cause control signals $I_{C10}$ and $I_{C11}$ to be formed at a high logical potential to determine whether subsequent input characters are upper or lower shift. The control signals $I_{C10}$ and $I_{C11}$ set flip-flop A1 (FIG. 1) as either true or false, and the outputs act to select certain columns of drive lines. Input characters following an upper and a lower shift input character are encoded into lower and upper case output characters, respectively, in the processor code, as will be discussed subsequently.

For selection of cores in code T, switches $S_1$ and $S_4$ are closed for the five bit representation of the input characters. Thus it should now be clear that by leaving switch $S_2$ open, transistors, as 75, controlled by signal $I_6$ connected to its base, are eliminated from the decoding. By closing switch $S_4$, transistors 100 and 101 are connected to ground 74 so that signals $A_1'$ or $A_1$ from flip-flop A1 will select cores for decoding upper or lower shift characters. It is to be noted that column drive lines are selected by the binary input signals $I_3$, $I_4$, $I_7$, and $I_8$ and their primes, while row drive lines are selected by the binary input signals $I_1$, $I_2$, $I_5$, and $I_6$ and their primes. This arrangement allows the desired selection of both columns and rows for input characters represented by only five bits, as well as by seven bits, for example. It is to be also noted that the decoding arrangement of the circuit of the present invention allows substitution for core matrix 22 of core matrices arranged for other input codes than those illustrated in the preferred embodiment, as will be explained in more detail subsequently. Although input code D of this embodiment is comprised of only seven bits, decoding network 26 provides for decoding eight binary bits by closing switch $S_5$. Thus the arrangement of the binary inputs to decoding networks 26 through 29 for selection of column and row drive lines allows decoding, with a suitable core matrix, of an input code comprised of any fixed number of binary bits up through eight.

Figure 8:
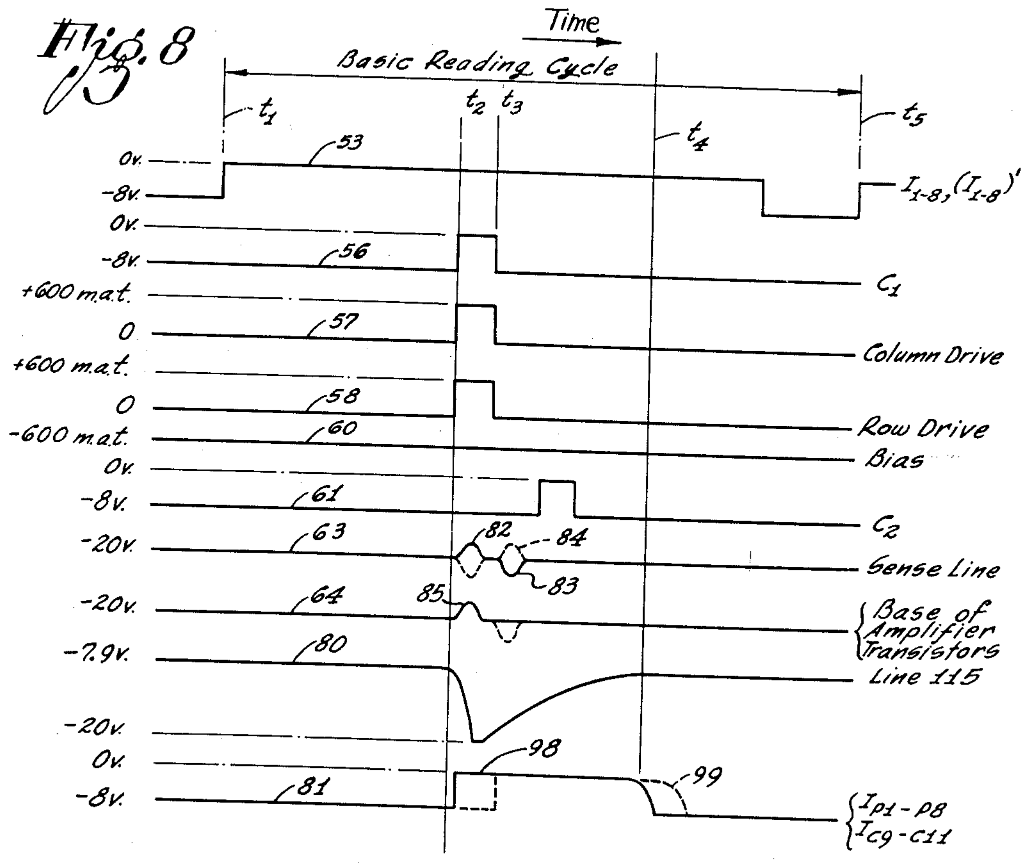
FIG. 8 is a schematic diagram of the waveforms to explain the operation of the circuits.
Figure 9:
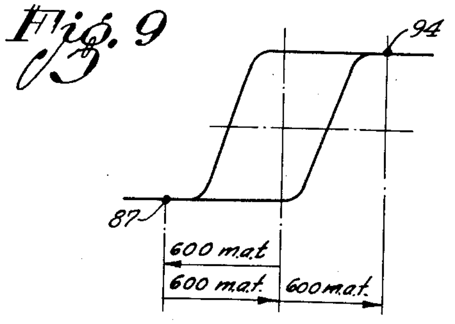
FIG. 9 is a schematic diagram of the magnetic characteristics of the cores for explaining the core biasing and driving arrangement.

Referring now also to FIG. 8 which shows waveforms to explain this invention, and to FIG. 9 which shows a hysteresis loop to explain the magnetic states of the cores, the operation of the decoding and core driving arrangement of FIG. 2 will be explained in more detail. The basic reading cycle during which a character is read on punched tape is from time $t_1$ to $t_5$. During each basic reading cycle at time $t_1$, coded input signals $I_{1-8}$ and $(I_{1-8})'$ as required for each input code are received from punched tape reading circuitry, for example, to pass into decoding networks 26 through 29. Coded input signals $I_{1-8}$ and $(I_{1-8})'$ which may be at a high or low logical level are shown at the high logical level of 0 volts by waveform 53. These coded inputs select a desired column and row drive line, as discussed. At time $t_2$, clock signal $C_1$ as shown by waveform 56 formed from the punched tape by tape reading circuitry (not shown) passes into decoding networks 27 and 29 to bias transistors 90 and 79 into conduction. Thus current pulses of +600 milliampere turns coercive force pass through the selected column and row drive lines as shown by waveforms 57 and 58, respectively, to coincide at the selected core, as 00–05. A constant bias current of −600 milliampere turns coercive force passes through each core from ground 31 through line 65 to −12 volt terminal 32 as shown by waveform 60. It is to be noted that waveforms 57, 58, and 60 are illustrative of the coercive driving force passing through the cores and the current amplitude depends upon the number of turns that the drive lines are wound through the cores. Thus each core is maintained at bias point 87 of its characteristic hysteresis loop, as shown in FIG. 9, by this bias current except when current pulses are passed through the column and row drive lines. Only a coincidence of +600 milliampere turn coercive force driving pulses of a column and row drive line as shown by waveforms 57 and 58, respectively, will overcome this bias current coercive force of waveform 60 and drive the core to its opposite magnetic state represented by point 94 of the hysteresis loop shown in FIG. 9. At time $t_3$, the column and row drive currents of waveforms 57 and 58, respectively, fall to zero upon the fall of clock signal $C_1$ of waveform 56, allowing the selected core to be returned to bias point 87 by the bias current coercive force of waveform 60. The signals induced on the sense lines as shown by waveform 63 resulting from a selected core being driven to its opposite magnetic state will be explained subsequently.

Figure 4:
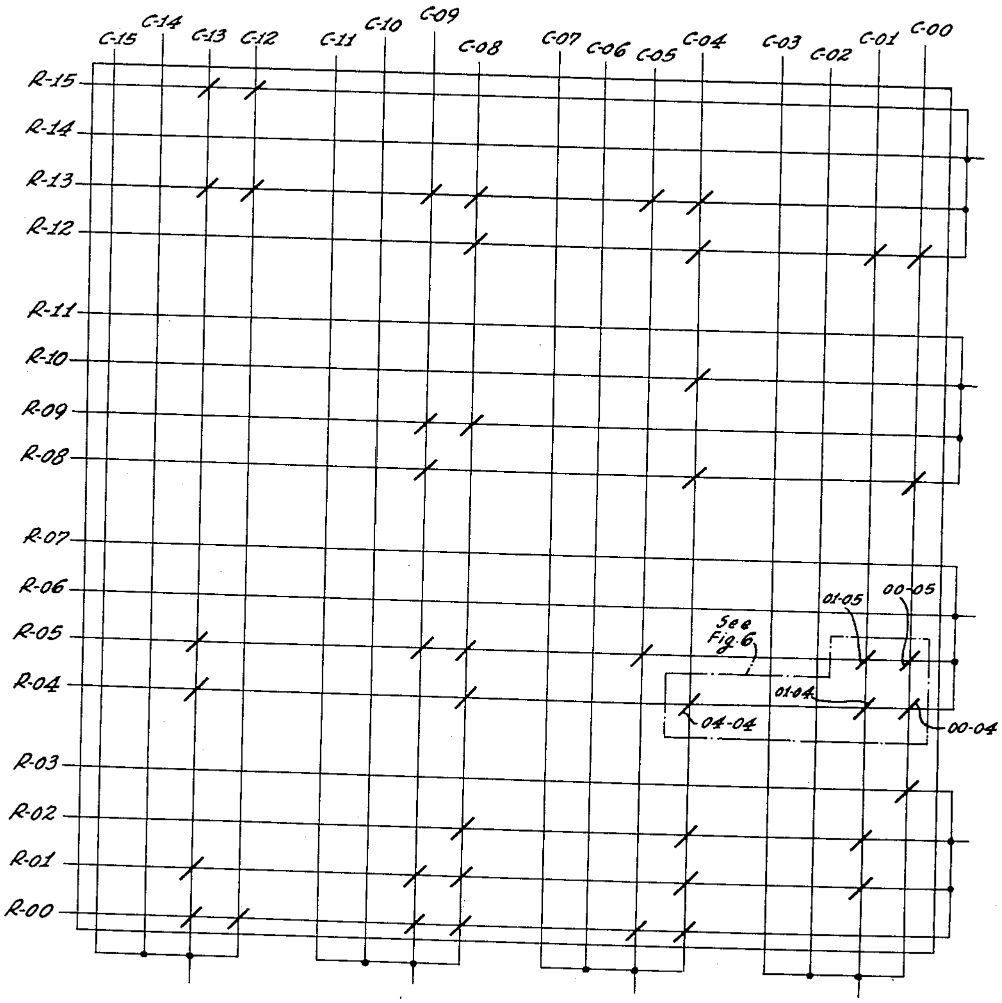
FIG. 4 is a circuit diagram of the core matrix of this invention to explain the arrangement of the cores utilized in this embodiment.

Referring now to FIG. 4 which shows a circuit diagram of the core matrix of the invention and also to the table of FIG. 3, the arrangement of the cores in the matrix will be further explained. The core or cores which are selected in response to the input character for each code F, D, and T are shown in the table of FIG. 3 and in the matrix of FIG. 4. In codes F and T which have an upper and a lower shift input character, i.e., have certain characters which determine whether certain subsequent binary input characters are one or another set, called upper or lower shift characters as is well known in the art, the binary state of flip-flop A1 (FIG. 1) determines whether cores representing upper or lower shift characters are selected. For example, in code F, the character A, which is defined as a lower shift input character, and the character *a*, which is defined as an upper shift input character, have the same binary inputs $I_1$ through $I_6$, and the binary state of flip-flop A1 determines whether core 00–05 or 01–05, respectively, is selected. Referring now also to FIG. 2, when flip-flop A1 is set true, as a result of a previous upper shift character having been received, output $A_1'$ is at a low potential and transistor 100 is biased into a conductive state to select, in combination with the binary input signals, drive lines C–01, C–05, C–09, or C–13, which pass through columns of cores representing lower case characters in the processor code. When flip-flop A1 is set false as a result of a previous lower shift input character having been received, output $A_1$ of flip-flop A1 is at a low potential and transistor 101 is biased into a conductive state to select, in combination with the binary input signals, column drive lines C–00, C–04, C–08, or C–12 which pass through columns of cores representing upper case characters in the processor code. Thus upper and lower shift input characters in code F, as characters *a* and A, respectively, are selected by transistors 100 and 101 responding to the outputs of flip-flop A1 (FIG. 1). Upper and lower shift selection in code T is similar as discussed in relation to code F. It is to be noted that for selection of a core in code F, switches $S_2$ and $S_4$ are closed, and for selection of a core in code T, switches $S_1$ and $S_4$ are closed.

Other characters of code F and T are used in common with both upper and lower shift input characters and are represented by a combination of binary bits which are utilized in the input code for only that character. Thus the one combination of binary input bits represents the one input character for both upper and lower shift. For example, the binary combination representing the character 1 in code F is only utilized for the character 1 and must therefore select a core representing 1 for either state of flip-flop A1. Thus two cores as 00–04 and 01–04 are utilized to represent the character 1 for conversion, so that the single binary combination of input signals will select one core or the other depending on the state of flip-flop A1. Therefore, selection of either core 00–04 or 01–04 results in decoding of the same character 1. Also it is to be noted that a single core can be used for decoding characters in a plurality of the input codes as core 04–04 which in code F, D, and T is selected for decoding characters 5, G, and H, respectively.

Figures 5, 6, 7:
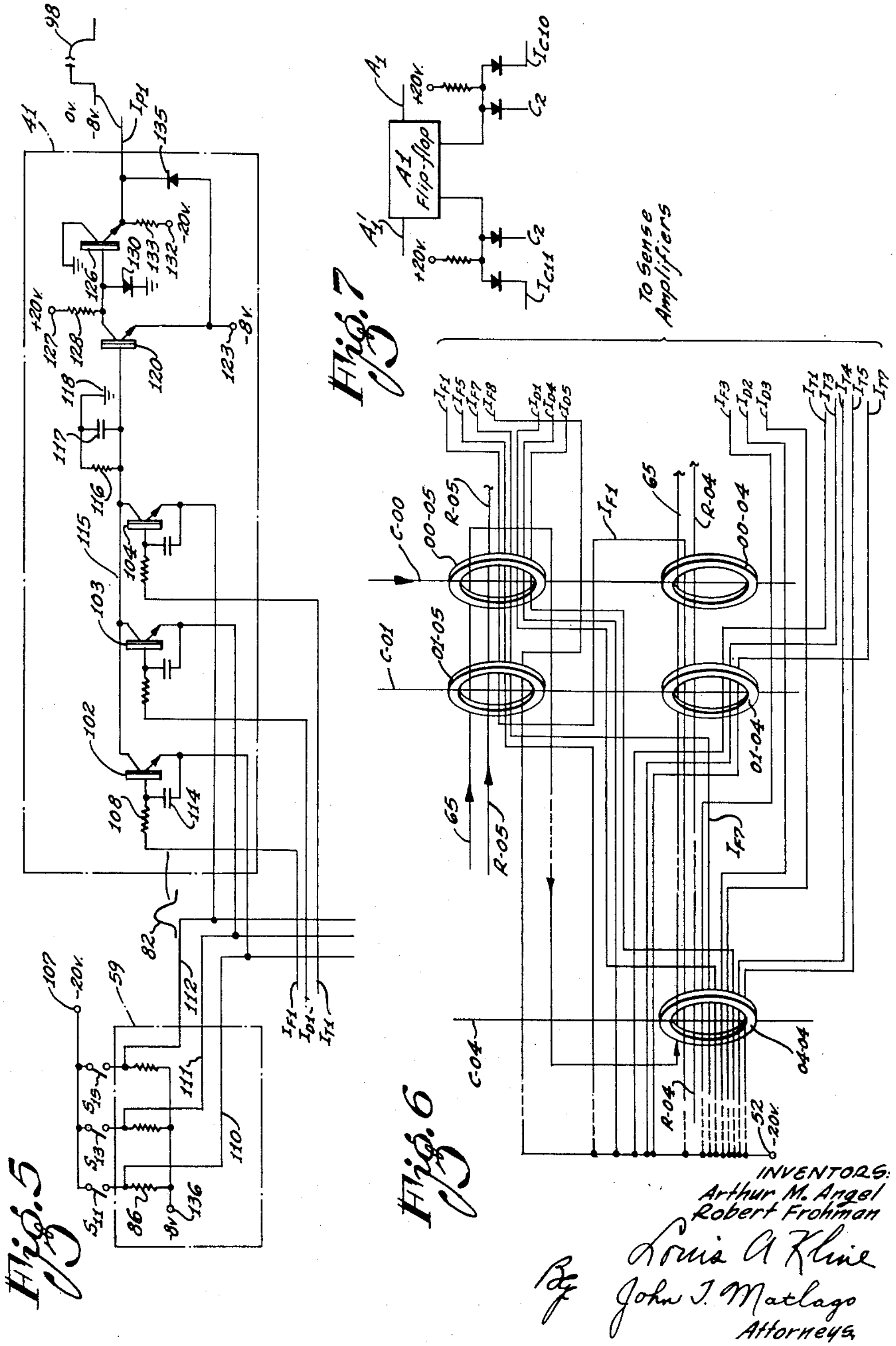
FIG. 5 is a circuit diagram to explain the arrangement of the sense amplifiers and the sense amplifier bias circuit.
FIG. 6 is a detailed circuit diagram of a portion of the core matrix of FIG. 4 to explain the arrangement of the sense lines.
FIG. 7 is a schematic diagram of the logical input network of flip-flop A1.

Referring now to FIG. 5 which shows a circuit diagram to explain the operation of the sense amplifiers of FIG. 1 the arrangement of the sense amplifiers and the bias circuit for the sense amplifiers will be explained before explaining in detail the sense lines wound through the cores. Sense amplifier circuit 41 comprises amplifier transistors 102, 103, and 104, all of the n-p-n type, with their bases connected to sense lines $I_{F1}$, $I_{D1}$, and $I_{T1}$, respectively. Each input code, F, D, or T, is selected by closing either switch $S_{11}$, $S_{13}$, or $S_{15}$ to connect −20 volt terminal 107 to either lines 110, 111, or 112 which connect to the emitters of amplifier transistors 102, 103, and 104, respectively. Switches as $S_{11}$, $S_{13}$, and $S_{15}$ may be closed by relays, for example. Each sense line as $I_{F1}$ connects to the base of an amplifier transistor as 102 by way of resistor 108. The base of transistor 102 is connected to emitter line 110 by way of capacitor 114 so resistor 108 and capacitor 114 act to integrate a signal on sense line $I_{F1}$ for discrimination of spurious pulses on sense line $I_{F1}$. The collector of amplifier transistors 102, 103, and 104 connects to common line 115 which in turn connects to ground 118 by way of resistor 116 and parallel capacitor 117 to form an R-C delay circuit, as will be explained subsequently. Line 115 also connects to the base of transistor 120 which is of the n-p-n type. The emitter of transistor 120 is connected to −8 volt terminal 123 and the collector is connected to the base of transistor 126. The collector of transistor 120 is also connected to +20 volt terminal 127 by way of resistor 128 and is clamped at ground potential by appropriately poled diode 130. Transistor 126 which is of the n-p-n type has its collector connected to ground potential and its emitter connected to −20 volt terminal 132 by way of resistor 133. Output line $I_{P1}$ is connected to the emitter of transistor 126 and is clamped to −8 volt terminal 123 by way of appropriately poled diode 135. In order to bias amplifier transistors as 102, 103, and 104 when unselected so as to prevent emitter to collector current leakage, −8 volt terminal 136 of bias circuit 59 is connected by way of resistors as resistor 86 to lines as 110. It is to be noted that each sense amplifier circuit 41 through 47 of FIG. 1 is similar to sense amplifier circuit 41 as described. Sense amplifier circuit 48 is similar to sense amplifier 41 except that only a single amplifier transistor connected to sense line $I_{F8}$ is required. Sense amplifier circuits 49, 50 and 51 are similar to sense amplifier circuit 41 except that only two amplifier transistors are required in each circuit for the sense lines $I_{F9}$, $I_{T9}$; $I_{F10}$, $I_{T10}$; and $I_{F11}$, $I_{T11}$, respectively. When one of the switches as $S_{11}$ (FIG. 5) is closed, all amplifier transistors as 102 connected to sense lines $I_{F1}$ through $I_{F11}$ are selected in sense amplifier circuits 41 through 51, respectively.

Now that the arrangement of the sense amplifier circuit has been explained, reference will next be made to FIG. 6 which shows a detailed circuit diagram of a portion of the core matrix of FIG. 4, for an explanation of the driving lines and sense lines wound through the cores. As was discussed, column drive lines as C–00 and row drive lines as R–05 carry current pulses to overcome a core biasing current passed through core bias line 65, to drive a selected core as 00–05 to its opposite state of magnetic flux. Referring also back to the table of FIG. 3, core 00–05 is selected, i.e., an input character is decoded, in response to the input signals representing input character A in code F and input character I in code D. Encoding of the selected core 00–05 in code F is carried out when switch $S_{11}$ is closed to select the desired transistor of the sense amplifier circuit (FIG. 5), as discussed. The binary representation of the character A in the processor code comprises signals $I_{P1}$, $I_{P5}$, $I_{P7}$ represented as ones, and $I_{P2}$, $I_{P3}$, $I_{P4}$, $I_{P6}$, and $I_{P8}$ represented as zeros. Therefore, in order to convert the character A in code F to the processor code, sense lines $I_{F1}$, $I_{F5}$, and $I_{F7}$ which connect to sense amplifiers 41, 45, and 47 (FIG. 1), respectively, are wound through core 00–05. This arrangement causes only the output signals $I_{P1}$, $I_{P5}$, and $I_{P7}$ to rise to the high logical potential when core 00–05 is selected and driven to its opposite magnetic state, thus forming the character A in the processor code.

Encoding the character I in code D is carried out when switch $S_{13}$ (FIG. 5) is closed to select the desired transistors of the sense amplifiers (FIG. 1). The character I in the processor code comprises signal $I_{P1}$, $I_{P4}$, and $I_{P5}$ represented as ones and the signals $I_{P2}$, $I_{P3}$, $I_{P7}$, and $I_{P8}$ represented as zeros. Thus sense lines $I_{D1}$, $I_{D4}$, and $I_{D5}$ are wound through core 00–05 to connect to sense amplifiers 41, 44, and 45 (FIG. 1), respectively. When core 00–05 is selected and driven to its opposite magnetic state for conversion from code D, a high logical voltage signal is formed on output lines $I_{P1}$, $I_{P4}$, and $I_{P5}$, respectively, to form the character I in the processor code.

Character *a* in input code F is decoded by selecting core 01–05. Character *a* in the processor code is comprised of output signals $I_{P1}$, $I_{P5}$, $I_{P7}$, and $I_{P8}$ represented as ones. Thus sense lines $I_{F1}$, $I_{F5}$, $I_{F7}$, and $I_{F8}$ are wound through core 01–05 so that when this core is selected, signals $I_{P1}$, $I_{P5}$, $I_{P7}$, and $I_{P8}$ are at a high potential. It is to be noted that since the binary representation $I_{P1}$ through $I_{P7}$ of the characters A and *a* are the same in the processor code, output signal $I_{P8}$ is required in the preferred embodiment to distinguish the characters A and *a* in the central processor. Cores 00–04 and 01–04 as discussed are both selected for decoding the character 1 in input code F since this one character is utilized for both upper and lower shift inputs. Since the character 1 in the processor code is represented by signal $I_{P1}$ in a true state (FIG. 3), sense line $I_{F1}$ is wound through both cores 00–04 and 01–04. Thus selection of either core 00–04 and 01–04 for decoding the character 1 in code F results in the character 1 in the processor code being formed. It is to be noted that core 01–04 is also selected for decoding the character 5 in code T.

For a further explanation of the winding of the sense lines, core 04–04 is selected for decoding in all three input codes, F, D, and T, by the input signals representing characters 5, G, and H, respectively, as discussed. Core 04–04 is wound with sense lines $I_{F1}$, $I_{F3}$, and $I_{F7}$, so that when converting the character 5 from input code F, output signals $I_{P1}$ and $I_{P3}$ and $I_{P7}$, respectively, will be at the high logical potential to form the character 5 in the processor code. For converting the character G from input code D, core 04–04 is wound with sense lines $I_{D1}$, $I_{D2}$, $I_{D3}$, and $I_{D5}$ so that output signals $I_{P1}$, $I_{P2}$, $I_{P3}$, and $I_{P5}$, respectively, will be at a high logical potential to form the character G in the processor code. Also, for converting the character H from the input code T, core 04–04 is wound with sense lines $I_{T4}$ and $I_{T5}$ so that output signals $I_{P4}$ and $I_{P5}$ will be at the high logical potential to form the character H in the processor code. Therefore, a single core may be selected for decoding input characters in all three input codes and will carry out encoding of the decoded characters by the desired combination of the presence and absence of sense lines wound through the core for each input code. Thus signals are formed on certain sense lines as a core is driven to its opposite magnetic state, so as to bias desired sense amplifier transistors into conduction to form the combination of output signals of the character in the processor code. It is to be noted that each amplifier transistor as 102 (FIG. 5) of each sense amplifier circuit as 41 of FIG. 1 is controlled by only a single sense line as $I_{F1}$ which is wound through all cores that are selected for decoding characters requiring output signal $I_{P1}$ to be at a high logical potential.

Referring now back to FIG. 5 and to the waveforms of FIG. 8, the operation of this invention will be explained in further detail by showing the time relation of the driving pulses and the output signals. Each sense line as $I_{F1}$ has a signal as pulse 82 of waveform 63 induced thereon when a selected core through which the sense line is wound is driven to point 94 of the characteristic hysteresis loop of the core (FIG. 9) from bias point 87 as a result of driving pulses 57 and 58 passing through the core at time $t_2$. When the positive pulse 82 of waveform 63 appears on sense line $I_{F1}$, the signal is integrated to provide discrimination against spurious signals on sense line $I_{F1}$ after passing through resistor 108 and capacitor 114. The integrated signal appears on the base of transistor 102 as the positive signal shown by pulse 85 of waveform 64 to bias transistor 102 into conduction.

Transistor 120 is normally conducting at time $t_1$ from +20 volt terminal 127 through resistor 128 to −8 volt terminal 123 as a result of base current flowing from ground 118 through resistor 116 through the base of transistor 120 to −8 volt terminal 123. When transistor 120 is normally conducting, line 115 is maintained at a potential of −7.9 volts as shown by waveform 80. When transistor 102 is biased into current conduction as a result of the positive pulse 85 of waveform 64 from a driven core being impressed on its base shortly after time $t_2$, capacitor 117 charges at constant rate from −7.9 volts to −20 volts to form the signal on line 115, as shown by waveform 80. After capacitor 117 is charged, current passing from ground 118 through resistor 116 and through transistor 102 to −20 volt terminal 107 maintains line 115 at −20 volts. When the potential of pulse 85 of waveform 64 falls, amplifier transistor 102 is biased into a non-conductive state to stop current conduction from ground through resistor 116 and through transistor 102 to −20 volt terminal 107. Also, as the potential on line 115, as shown by waveform 80, falls below −8 volts, a short period after time $t_2$, transistor 120 is biased into a non-conductive state and the potential on its collector starts to rise from approximately −8 volts toward +20 volts to be clamped at ground potential by the action of diode 130. When transistor 120 is normally conducting, transistor 126 conducts a small current so output line $I_{P1}$ is clamped at the low logical potential of −8 volts through clamping diode 135. When transistor 120 is not conducting, as a result of transistor 102, 103, or 104 biased into conduction, transistor 126 conducts with an internal voltage drop such that output line $I_{P1}$ rises to the high logical potential of ground as shown by pulse 98 of waveform 81. It is to be noted that transistor 126 is arranged in an emitter follower configuration so as to provide a low output impedance to the output signal on output line $I_{P1}$.

When the potential of the positive signal on sense line $I_{F1}$ falls as shown by pulse 82 of waveform 63, transistor 102 is biased out of conduction and capacitor 117 discharges through resistor 116 toward ground potential with a desired R-C time constant. The potential on line 115 during discharge is shown by waveform 80. At time $t_4$, capacitor 117 is discharged so the potential on line 115 has risen to −7.9 volts and transistor 120 is biased back into conduction, thus effectively clamping the potential on line 115 at this voltage. The collector of transistor 120 then rises to −8 volts which is impressed on the base of transistor 126, and the current flow through transistor 126 is reduced. Thus the potential on the output line $I_{P1}$, as shown by pulse 98 of waveform 81, falls toward −8 volts where it is clamped at −8 volts by diode 135.

When the column and row drive pulses of waveforms 57 and 58, respectively, fall to zero current at time $t_3$, the selected core returns to bias point 87 (FIG. 9) with a negative signal induced on the sense line $I_{F1}$, as shown by pulse 83 of waveform 63, which signal does not bias transistor 102 into conduction. Although the positive pulse 82 of waveform 63 appeared at time $t_2$, the positive pulse may appear at a later time as shown by dashed pulse 84 depending on the direction that sense line $I_{F1}$ is wound through the selected core. For this condition, the circuit acts in a similar manner as discussed in response to pulse 84 to form an output signal as shown by dashed pulse 99 of waveform 81. It is to be noted that the output signals on output lines as $I_{P1}$ through $I_{P8}$ and $I_{C9}$ through $I_{C11}$ as shown by pulses 98 or 99 of waveform 81 are high in potential in response to the corresponding sense line being wound through a selected core. This high potential signal corresponds to a binary one on the output. The signal on the output lines as $I_{P1}$ through $I_{P8}$ remains at the logical voltage level of −8 volts for a binary output of zero when a corresponding sense line is not wound through a selected core. Clock signal $C_2$ which is clock signal $C_1$ delayed by delay circuit 25 (FIG. 1) rises while signals $I_{C10}$ and $I_{C11}$ of pulses 98 or 99 of waveform 81 are at their high potential. Thus flip-flop A1 (FIG. 7) which is controlled by clock signal $C_2$ and signals $I_{C10}$ and $I_{C11}$, as will be explained, is triggered to its desired state before the control output pulses $I_{C10}$ and $I_{C11}$ have fallen in potential.

Referring now to FIGS. 1 and 3 and to FIG. 7 which is a schematic diagram of the logical input networks of flip-flop A1, the control arrangement of this system will be explained. Flip-flop A1 is internally arranged as a cross gated flip-flop in which the outputs are used for triggering its logical inputs, as is well known in the art. Since clock signal $C_2$ of waveform 61 has a long time duration, this cross gated arrangement is required in order to provide reliability in the action of the flip-flop. When signal $I_{C10}$ as shown by waveform 98 is true, i.e., at a high potential when clock signal $C_2$ as shown by waveform 61 rises, flip-flop A1 is set true, and consequently output $A_1'$ is false so as to select cores representing upper shift characters in the input codes which are encoded into lower case characters in the processor code.

as discussed previously. Also, when signal $I_{C11}$ is true, i.e., at a high potential, flip-flop A1 is set false upon the rise of clock signal $C_2$, thus selecting cores representing lower shift characters in the processor codes, as discussed. Control signals $I_{C10}$ and $I_{C11}$ are formed in the true state, i.e., high in potential, when an upper shift or lower shift input character, respectively, is received by the decoding networks and decoded by selecting a core. The cores selected for decoding the upper shift input character are either cores 08–13 or 09–13 for codes F and T; and for decoding the lower shift input character, either cores 08–09 or 09–09 for code F, and either cores 12–13 or 13–13 for code T. Thus the upper shift character and the lower shift character is decoded for either state of flip-flop A1.

Control signal $I_{C9}$, as seen in FIG. 1, passes to clock inhibit circuitry (not shown). Control signal $I_{C9}$ is a true signal for decoding of the upper shift character by winding sense lines $I_{F9}$ and $I_{T9}$ through cores 08–13 and 09–13. Also, control signal $I_{C9}$ is a true signal for decoding of the lower shift character by winding sense line $I_{F9}$ through cores 08–09 and 09–09, and sense line $I_{T9}$ through cores 12–13 and 13–13. Thus control signal $I_{C9}$ passes to clock inhibit circuitry at the high logical potential when the upper or lower shift cores are selected and driven to prevent any signals being received by the processor, during the basic reading cycle when either an upper or lower shift character is decoded.

The code delete character in code F is utilized when it is desired to delete a character punched in error in tape, as is known in the art. Control signal $I_{C9}$ is utilized not only with upper and lower shift input characters as discussed, but with the code delete input characters. As discussed, control signal $I_{C9}$ is a clock inhibit signal which passes to the processor at the high logical potential to prevent use of a character by the central processor. Since the code delete character of input code F is utilized when both upper and lower shift characters are converted, selection of either core 12–15 or 13–15 results in decoding of this character. Thus sense line $I_{F9}$ is wound through both cores 12–15 and 13–15 to cause signal $I_{C9}$ to rise to the high logical potential as a result of selection of either core. Therefore, an input character is encoded into a single output control signal $I_{C9}$ by winding a single sense line $I_{F9}$ through the cores selected for decoding.

Referring back to FIGS. 1 and 3, the parity check system of this invention will be explained in detail. Output signal $I_{P7}$ represents the parity check bit accompanying each character in the processor code, as was explained. This parity bit $I_{P7}$, which causes the binary representation $I_{P1}$ through $I_{P7}$ to be comprised of an odd number of ones, is formed in each core in the selected code F, D, or T by the presence or absence of sense lines $I_{P7}$, $I_{D7}$, or $I_{T7}$, respectively. Thus the parity bit is formed by only adding an additional sense amplifier circuit and a sense line for each input code encoded. Parity generator 55 responds to the signals on output lines $I_{P1}$ through $I_{P7}$ to detect an error and pass an error signal to the central processor. Therefore, an error resulting from faulty components as sense amplifier circuits between a selected core and the signals on the output lines $I_{P1}$ through $I_{P7}$ is detected by parity generator 55.

It will be evident that in the light of the present disclosure, modifications and changes will occur to those skilled in the art and accordingly it is not desired to limit the invention to the specific details of the exemplary illustrated embodiment other than as defined in the appended claims.

What is claimed is:

1. Apparatus for converting combinations of input signals representing information in any one of a plurality of input codes into desired combinations of output signals representing said information in a common output code comprising: a set of input lines; a set of output lines; a matrix of cores of magnetic material having substantially rectangular hysteresis loop characteristics; a separate set of sense lines for each input code and predetermined ones of the sets of sense lines inductively coupled to each of said cores; decoding means including a first group of switches selectively actuable according to the input code for controlling the response of the decoding means to signals on said set of input lines to select and drive a core of said matrix to the opposite magnetic polarity, thereby providing signals on the predetermined ones of the set of sense lines coupled to the selected core; a set of amplifying means for supplying signals on said set of output lines; and means including switches selectively actuable according to the input code for controlling the response of said set of amplifying means to the signals on the predetermined ones of the set of sense lines coupled to the selected core, to thereby provide signals on said set of output lines according to the output code.

2. Apparatus for converting combinations of input signals representing information in one of a plurality of input codes to combinations of output signals representing information in a common output code, comprising: a set of input lines; a set of output lines; a matrix of cores of magnetic material having substantially rectangular hysteresis loop characteristics; a set of sense lines inductively coupled to each of said cores; decoding means responsive to signals on the input lines for selecting cores of said matrix to be driven to the opposite magnetic polarity; a first plurality of switches settable in accordance with the input code being sensed to control the connection arrangement of the input lines to said decoding means; a plurality of amplifying means each having an output connected to an output line; and a second plurality of switches settable in accordance with the input code being sensed to control the connection arrangement of the selected sense lines to said amplifying means.

3. Apparatus for converting characters each represented by combinations of signals in any one of a plurality of input codes received over a plurality of input conductors, into a common output code represented by different combinations of signals on a plurality of output conductors, comprising: a plurality of bistable magnetic elements; a decoding network including driving means interconnecting said elements and said input conductors in a predetermined manner for effecting the selection of only one of said elements according to the particular combination of signals received over said input conductors, and for driving the selected element to its opposite magnetic state; a plurality of separate sets of sense lines, one set for each of said plurality of input codes, and each set having a sense line corresponding to each output conductor, and predetermined ones of one or more sets thereof being inductively coupled to each element according to the number of characters represented by the element, said predetermined ones of each set being connected to those corresponding output conductors as required to represent in the output code, the character represented by the magnetic element selected; and selecting means for selecting only those predetermined ones of that set of the plurality of separate sets of sense lines corresponding to the input code in which the input character is represented to produce signals on those output conductors corresponding only to the predetermined sense lines of the selected set.

4. Apparatus for converting combinations of signals representing characters in any one of a plurality of input codes received over a plurality of input conductors to combinations of output signals representing characters in a common output code supplied on a plurality of output conductors comprising: a plurality of bistable magnetic elements arrayed in columns and rows; a decoding network including a plurality of column drive elements responsive to signals on certain of the input conductors, and a plurality of row drive elements responsive to signals on the remainder of the input conductors for effecting the selection of any one of the elements and for driving the selected element to its opposite magnetic state; means operative to control the response of said decoding network to signals on said input conductors in accordance with the particular input code to be converted; a separate set of sense lines for each input code and each set having a sense line corresponding to each output conductor, and predetermined ones of one or more sets thereof being inductively coupled to each element according to the number of characters represented by the element; amplifying means for connecting predetermined ones of each set of sense lines to those corresponding output conductors as required to represent in the output code, the character represented by the magnetic element selected; and selecting means for selecting only those predetermined ones of that set of sense lines corresponding to the input code in which the input character is represented to supply signals on those output conductors corresponding only to the predetermined sense lines of the selected set.

5. Apparatus for converting characters each represented by combinations of signals in any one of a plurality of input codes received over a plurality of input conductors, into a common output code represented by different combinations of signals on a plurality of output conductors, comprising: a plurality of bistable magnetic elements arranged in columns and rows; a decoding network including a plurality of column drive elements responsive to signals on certain of the input conductors, and a plurality of row drive elements responsive to the signals on the remainder of the input conductors for effecting the selection of any one of the bistable magnetic elements, and for driving the selected element to its opposite magnetic state; means operative to control the response of said decoding network to signals on said input conductors in accordance with the particular input code to be converted; a separate set of sense lines for each input code and each set having a sense line corresponding to each output conductor, and predetermined ones of one or more sets thereof being inductively coupled to each element according to the characters represented by the element; a plurality of amplifier devices, one for each of the output conductors, and each comprising a plurality of sensing elements, one for each of the input codes; and a plurality of switch members selectively actuable to select corresponding sensing elements of each of the amplifier devices according to the input code in which the input character is represented whereby, for any selected magnetic element, the predetermined sense lines of the set corresponding to the input code and inductively coupled to the selected magnetic element are connected via the selected sensing elements of the amplifier devices corresponding to the predetermined sense lines to produce high potential signals on the output conductors corresponding to the predetermined sense lines of that set.

6. Apparatus for converting characters each represented by combinations of signals in any one of a plurality of input codes received over a plurality of input conductors, into a common output code represented by different combinations of signals on a plurality of output conductors, comprising: a coordinate assembly of bistable magnetic elements; a decoding network including a plurality of column drive elements responsive to signals on certain of the input conductors, and a plurality of row drive elements responsive to the signals on the remainder of the input conductors; a first plurality of switch members selectively actuable to connect certain of said input conductors to predetermined column and row drive elements for effecting the selection of one of the bistable magnetic elements, and for driving the selected element to its opposite magnetic state; a separate set of sense lines for each input code and each set having a sense line corresponding to each output conductor, and predetermined ones of one or more sets thereof being inductively coupled to each bistable magnetic element according to the number of characters represented by the element; a plurality of amplifier devices, one for each of the output conductors, and each comprising a plurality of sensing elements, one for each of the input codes; and a second plurality of switch members selectively actuable to select corresponding sensing elements of each of the amplifier devices according to the input code in which the input character is represented, whereby, for any selected magnetic element, the predetermined sense lines of the set corresponding to the input code and inductively coupled to the selected magnetic element are connected via the selected sensing elements of the amplifier devices corresponding to the predetermined sense lines to produce high potential signals on the output conductors corresponding to the predetermined sense lines of that set.

7. Apparatus according to claim 6 wherein each said amplifier device includes a delay circuit, a normally conductive output transistor, and a plurality of amplifier transistors, one of the latter for each input code, each amplifier transistor having the emitter thereof connected to a low potential source via one of the second plurality of switch members, the base of each amplifier transistor being connected to the corresponding sense line of a different set of lines, the collectors of each amplifier transistor being connected via said delay circuit to a high potential source, and the output of each said delay circuit being connected via said normally conductive output transistor to the corresponding output conductor whereby a signal, on a sense line connected to the base of any one of the amplifier transistors as a result of a magnetic element to which the sense line is inductively coupled, changing to its opposite magnetic state, is delayed in the respective delay circuit so as to produce a pulse on the corresponding output conductor, of a predetermined time duration.

8. Apparatus according to claim 6, including a bistable device having a pair of outputs; a pair of said column drive elements in said decoding network being connected, one to each of the outputs of said bistable device and responsive to a low potential on one or the other of said outputs to respectively energize a first or second group of column drive lines passing through character magnetic elements in said coordinate assembly representing upper and lower shift input characters respectively; a magnetic element in said coordinate assembly representing an upper shift selection character; a magnetic element in said coordinate assembly representing a lower shift selection character; one of said shift selection magnetic elements being selected in accordance with the response of said decoding network to the code signals on the input conductors representing a shift selection character and a clock signal; one or more sense lines passing through each the shift selection magnetic elements according to the number of input codes to which each said shift selection magnetic elements are responsive; the sense lines of each shift selection magnetic element being connected to a separate amplifier device, a delay circuit for said clock signal, and each said amplifier device producing an output therefrom when a shift selection magnetic element connected thereto is selected, said output from said amplifier device together with the delayed clock signal forming inputs for said bistable state device whereby a low potential is produced on one or other of the outputs thereof to select one or other of said groups of column drive lines to determine whether character magnetic elements representing upper or lower shift input characters are selected for decoding the input code to lower and upper case characters respectively on the output code.

References Cited in the file of this patent

UNITED STATES PATENTS

| | | |
|---|---|---|
| 2,518,022 | Keister | Aug. 8, 1950 |
| 2,733,860 | Rajchman | Feb. 7, 1956 |
| 2,835,828 | Vogelsong | May 20, 1958 |
| 2,843,838 | Abbott | July 15, 1958 |
| 2,905,934 | Flint | Sept. 22, 1959 |
| 2,912,679 | Bonorden | Nov. 10, 1959 |